United States Patent [19]

Robertson

[11] Patent Number: 5,276,333
[45] Date of Patent: Jan. 4, 1994

[54] X-RAY CASSETTE HAVING REMOVABLE PHOTOGRAPHIC ELEMENT

[75] Inventor: Jeffrey C. Robertson, Rochester, N.Y.

[73] Assignee: Eastman Kodak Company, Rochester, N.Y.

[21] Appl. No.: 800,799

[22] Filed: Nov. 27, 1991

[51] Int. Cl.[5] ............................................. G03B 42/04
[52] U.S. Cl. ................................... 250/484.4; 378/186
[58] Field of Search ................... 378/182, 185, 186; 250/484.1, 327.2; 206/455

[56] References Cited

U.S. PATENT DOCUMENTS

| | | | |
|---|---|---|---|
| 2,706,939 | 4/1955 | Fairbank | 378/183 |
| 2,723,147 | 11/1955 | Slaughter, Jr. et al. | 292/302 |
| 4,251,150 | 2/1981 | Bauer et al. | 354/281 |
| 4,264,179 | 4/1981 | Bauer et al. | 354/281 |
| 4,303,327 | 12/1981 | LaBelle et al. | 378/188 |
| 4,380,087 | 4/1983 | Tanaka | 378/186 |
| 4,457,010 | 6/1984 | Jenkins et al. | 378/210 |
| 4,482,233 | 11/1984 | Bauer et al. | 354/312 |
| 4,637,043 | 1/1987 | Bauer | 378/188 |
| 4,681,227 | 7/1987 | Tamura et al. | 378/182 |
| 4,809,313 | 2/1989 | Gandolfo | 378/182 |
| 4,827,136 | 5/1989 | Bishop, Jr. et al. | 250/484.18 |
| 4,889,233 | 12/1989 | Torii | 378/182 |
| 4,903,286 | 2/1990 | Niedospial et al. | 378/182 |
| 4,951,305 | 8/1990 | Moore et al. | 378/147 |
| 4,961,000 | 10/1990 | Finkenzeller et al. | 250/484.1 B |
| 4,972,450 | 11/1990 | Carlile et al. | 378/182 |
| 5,008,920 | 4/1991 | Gralak | 378/186 |
| 5,025,465 | 6/1991 | Bauer et al. | 378/188 |
| 5,065,866 | 11/1991 | Boutet et al. | 378/182 |
| 5,090,567 | 2/1992 | Boutet | 206/455 |

Primary Examiner—Carolyn E. Fields
Attorney, Agent, or Firm—Frank Pincelli

[57] ABSTRACT

An x-ray cassette having a shell, an x-ray grid disposed within the shell, and a photographic element removably disposed within the shell. The photographic element is supported substantially independently of the shell.

24 Claims, 9 Drawing Sheets

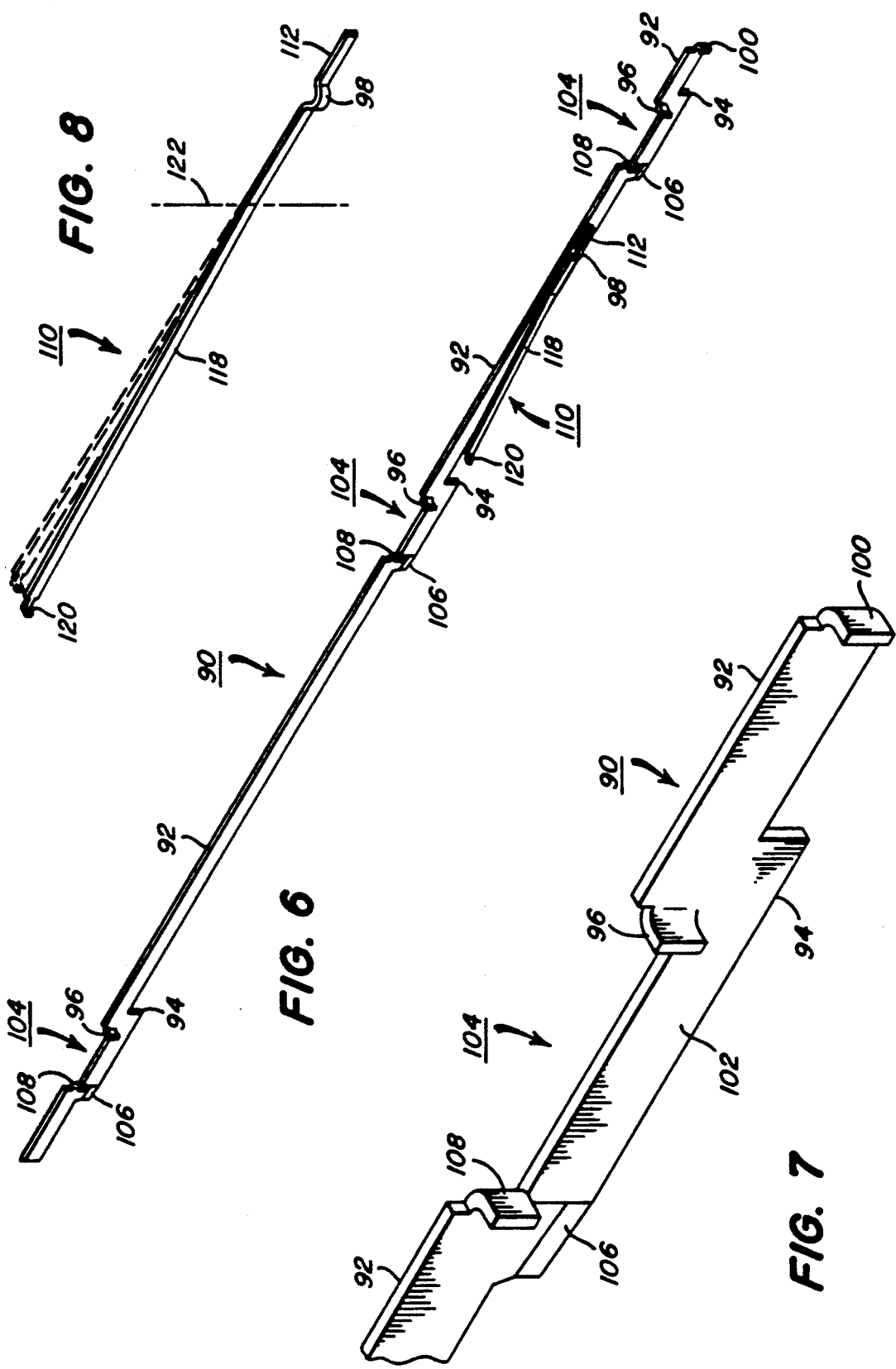

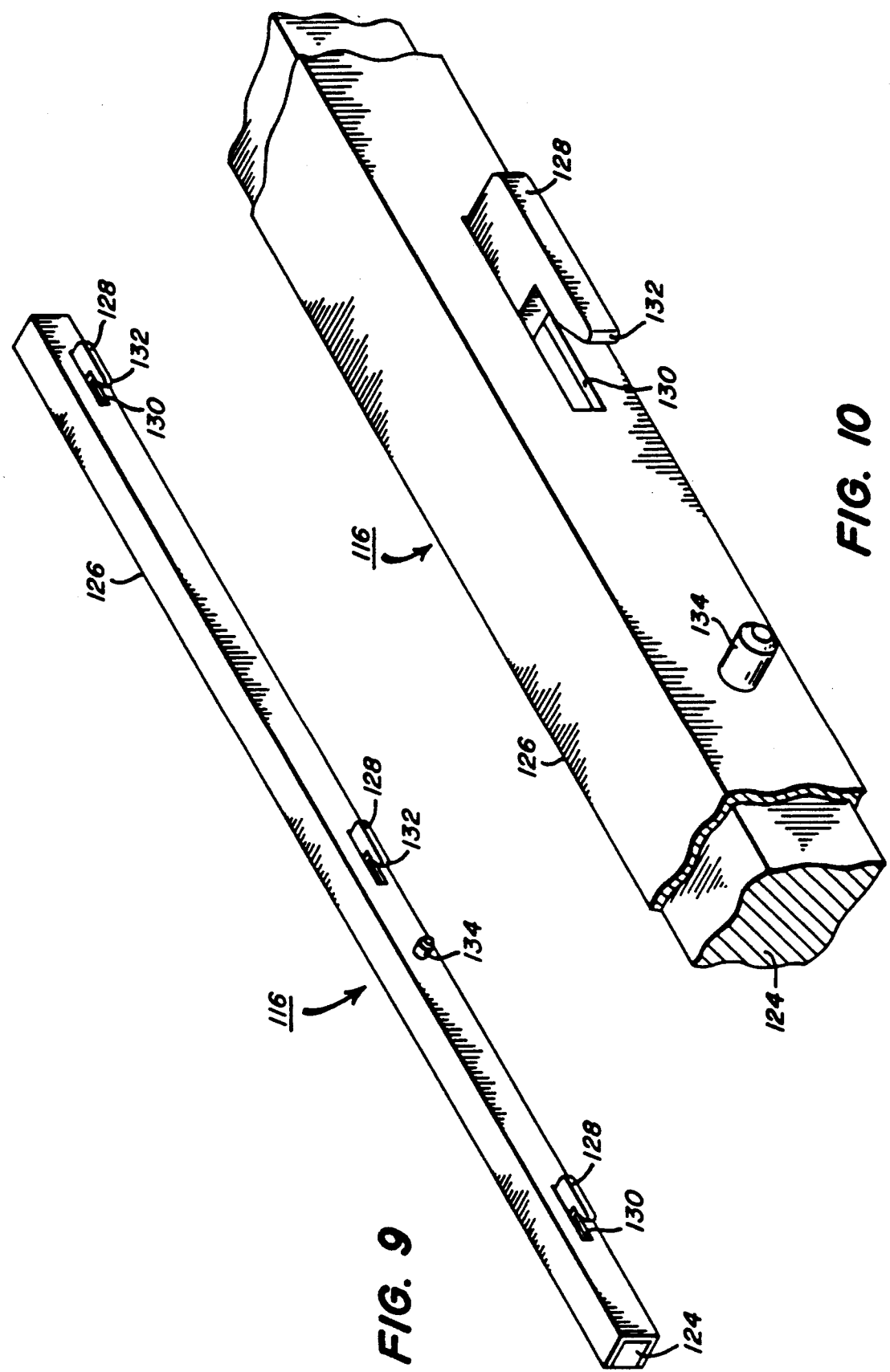

X-RAY CASSETTE HAVING REMOVABLE PHOTOGRAPHIC ELEMENT

BACKGROUND OF THE INVENTION

The invention relates to cassettes for photographic elements and, more particularly, to a cassette for an x-ray phosphor film plate of the kind used in computed radiography.

In computed radiography, a photographic element has an image formed thereon by x-rays, and the element is subsequently provided to a reader where the photographic element is stimulated to emit a radiation pattern that is captured for storage and use. Cassettes of the kind used in computed radiography may comprise a container having upper and lower parts that are hinged together so that they can be opened for insertion of a thin, flexible film sheet or rigid film plate comprising the photographic element. The cassette is closed and latched so that the cassette with the element therein can be used with an x-ray apparatus to produce an image on the photographic element. Then the cassette is taken to a reader where the cassette must be opened and the photographic element extracted by suitable feeders, such as suction feeding devices. The photographic element separate from the cassette is transported through the reader where it is stimulated to emit a radiation pattern and subsequently erased before being returned to the cassette for re-use. The cassettes and photographic elements as described above have generally been satisfactory, however, the cassettes can be relatively expensive, and flexible photographic elements require special feeding devices for extracting them from the cassette and returning them to the cassette. A cassette disclosed in U.S. patent application Ser. No. 728,432 filed Jul. 11, 1991 by Jeffrey C. Robertson, minimizes cost of the cassette and simplifies delivery of the photographic element to the reader for image processing. An extractor having a series of hooks can enter that cassette and engage and extract a removable photographic element assembly. That cassette has the shortcomings, that the photographic element assembly is difficult to remove from the cassette manually for cleaning and the like, that the cassette does not include an x-ray grid and that the x-ray film element forms the bottom of the cassette.

SUMMARY OF THE INVENTION

Accordingly, it is an object and advantage of the invention to provide a simple cassette, for an x-ray phosphor film plate of the kind used in computed radiography, which can include an x-ray grid and has a photographic element assembly, that is removable from a shell by a hooked extractor or manually with a stylus.

In accordance with the present invention, a cassette is disclosed having a shell, an x-ray grid disposed within the shell, and a photographic element removably disposed within the shell. The film element is supported substantially independently of the grid.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 6 is a perspective view of a latch bar and an attached catch;

FIG. 7 is an enlarged fragmentary perspective view of a portion of the latch bar of FIG. 6;

FIG. 8 is an enlarged perspective view of the catch of FIG. 6;

FIG. 9 is a perspective view of an extractor for unlatching and removing the insert;

FIG. 10 is an enlarged fragmentary perspective view of a portion of the extractor of FIG. 9;

DETAILED DESCRIPTION OF THE PREFERRED EMBODIMENT

Figure 1:
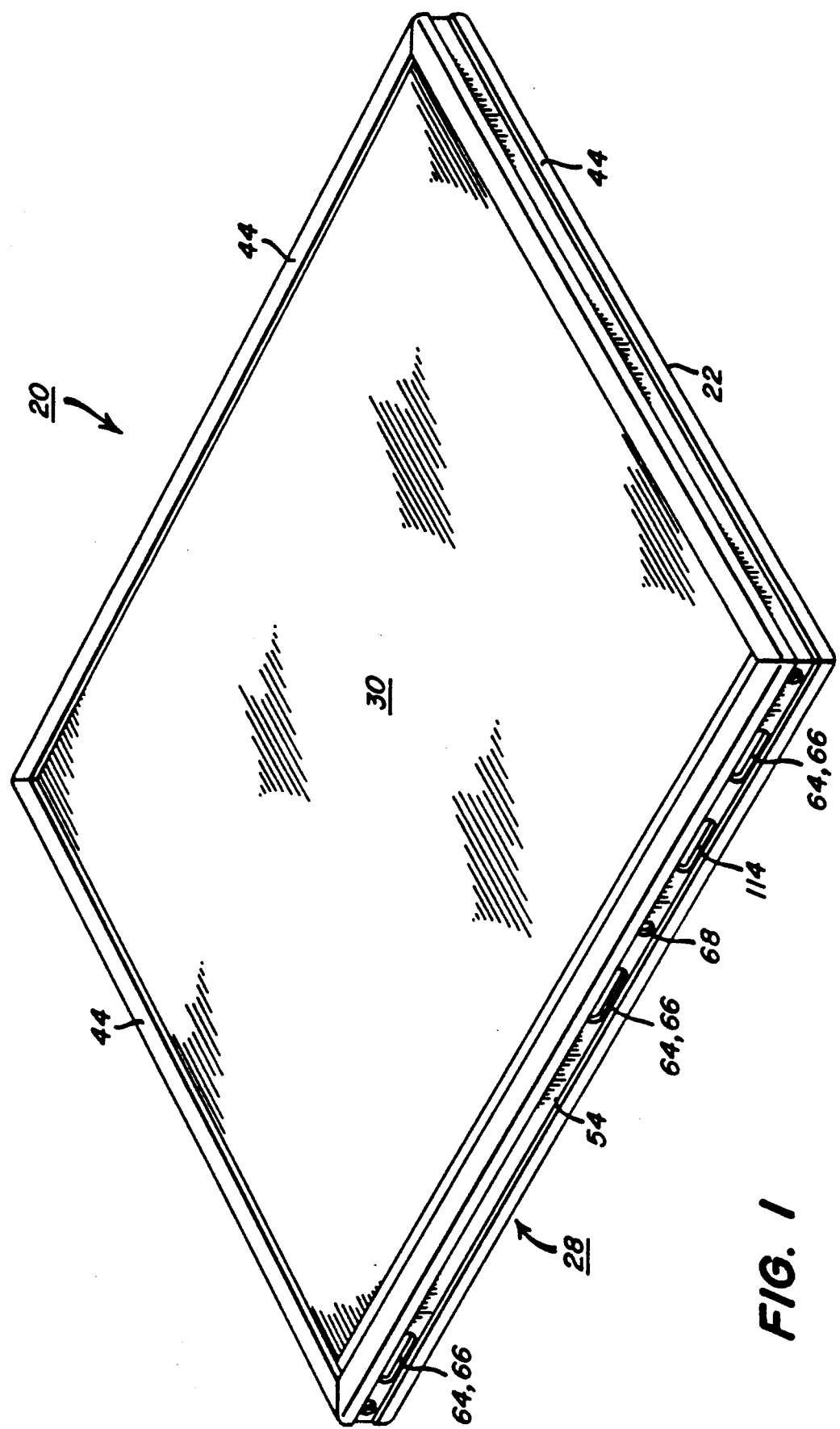
FIG. 1 is a perspective view of a preferred embodiment of a cassette of the invention showing the top, front and one side of the cassette.
Figure 2:
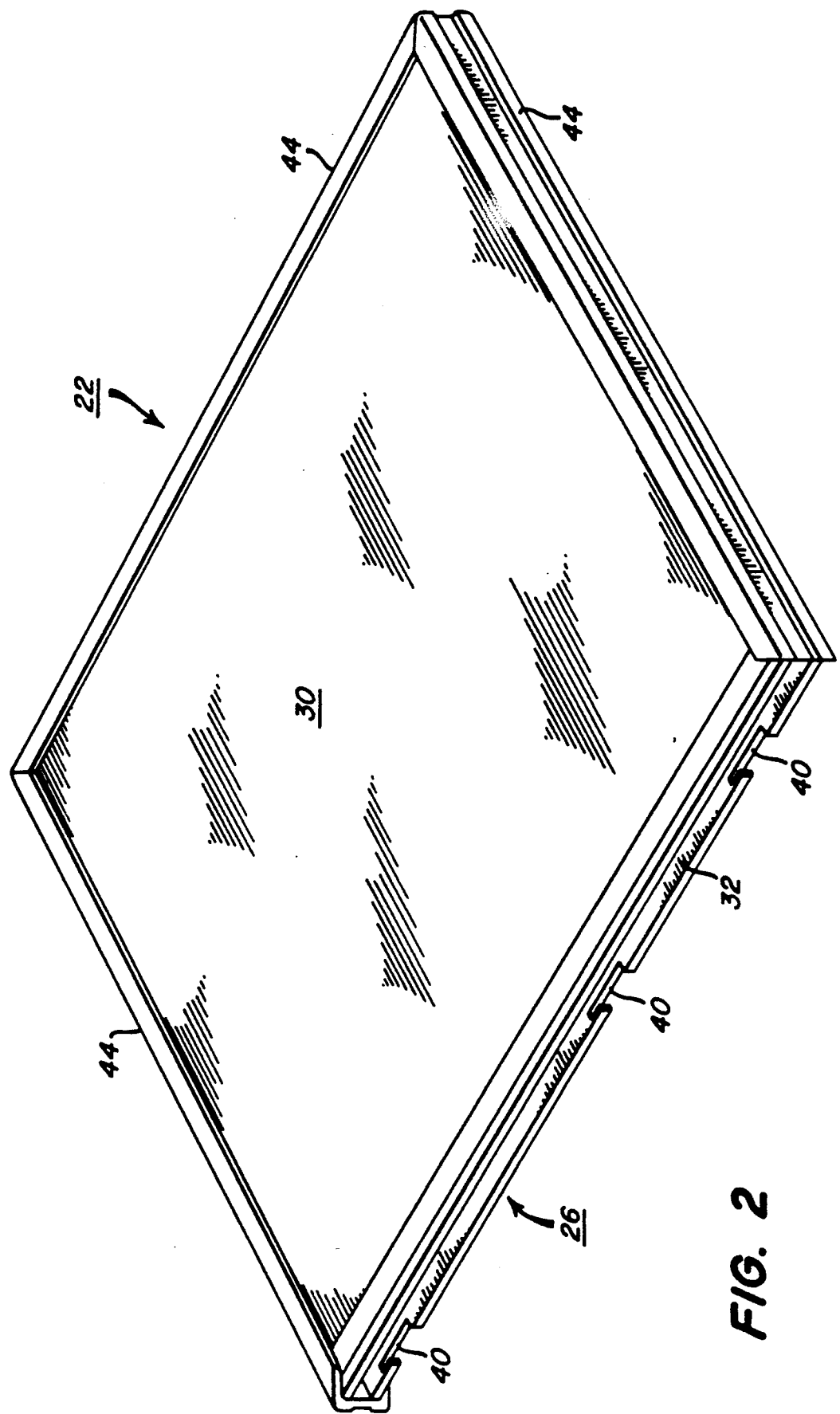
FIG. 2 is a perspective view of the shell of the cassette of FIG. 1.
Figure 3:
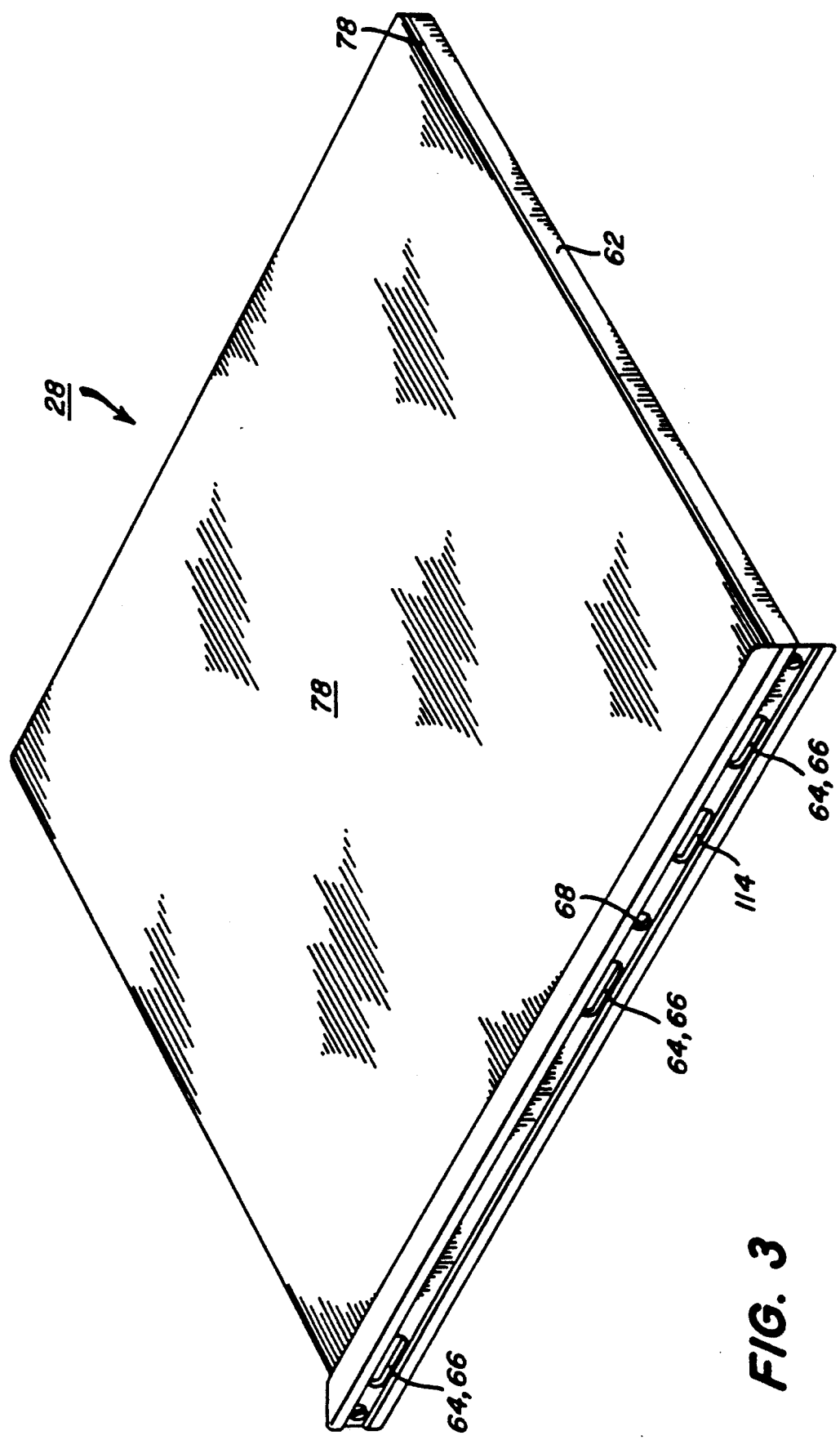
FIG. 3 is a perspective view of the insert of the cassette of FIG. 1.

Referring initially to FIGS. 1, 2 and 3, a cassette 20 of the invention has a shell 22 (FIG. 2), which defines a chamber 24 and a chamber opening 26, and a removable insert 28 (FIG. 3). Shell 22 has rectangular upper and lower panels 30,32, respectively.

Figure 5:
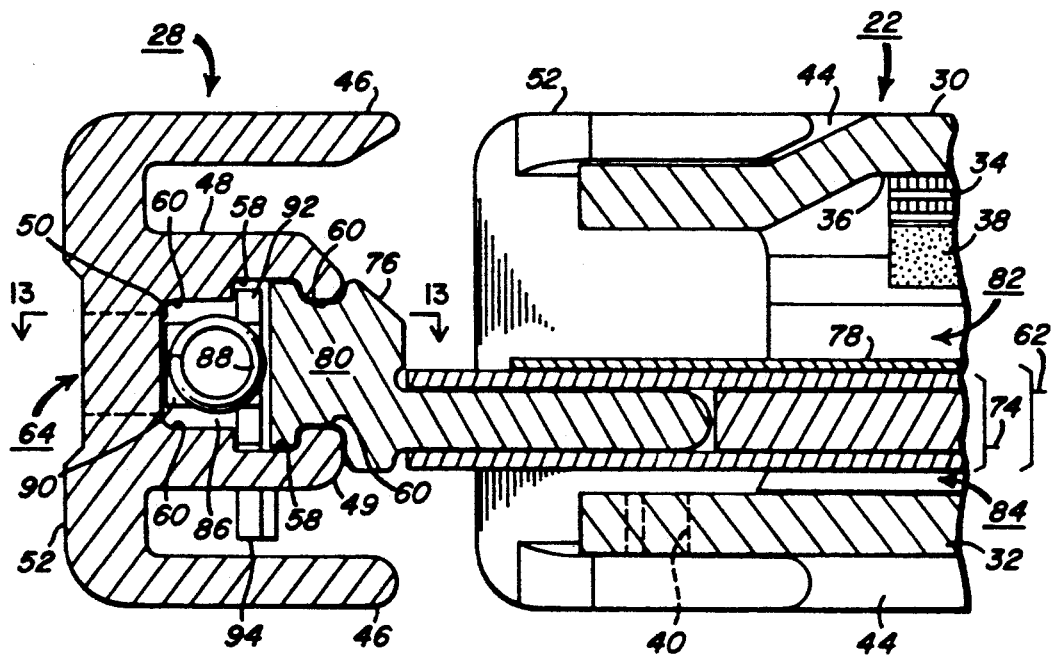
FIG. 5 is an enlarged fragmentary, cross-sectional view taken substantially along line 5-5 of FIG. 1.

Upper panel 30 is a sheet of x-ray transmissive, relatively stiff material, such as aluminum sheet or a polycarbonate-carbon fiber composite matrix. Upper panel 30 can be covered on the outside by a layer of vinyl or other cosmetic or protective material (not shown). Referring now to FIG. 5, in a particular embodiment of the invention, upper panel 30 has an x-ray grid 34 attached on its inside surface by adhesive or the like. Suitable x-ray grids 34 are disclosed in U.S. Pat. No. 4,951,305 to Moore et al, which is incorporated herein by reference. Those grids 34 have a plurality of grid patterns of x-ray opaque material formed on sheets of x-ray transparent material, arranged in a stack such that the grid patterns are spaced apart from one another, as shown in semi-diagrammatical form in FIG. 5. It is desirable that upper panel 30 be formed so as to provide a central recess 36 in its lower side for grid 34. The recess 36 both reduces flexing of upper panel 30 during use and helps protect grid 34 from damage due to contact with insert 28. To further protect grid 34, it is desirable to have a layer of fabric covered foam 38, or the like, on the bottom of grid 34.

Lower panel 32 has a sheet of relatively stiff, light weight material, such as aluminum sheet and can also be covered on the outside by a layer of material (not shown). Lower panel 32 has several, spaced-apart latch notches 40 in its front edge. Notches 40 are all aligned in the same direction and each notch 40 has a set-back portion 42 at one end.

Figure 4:
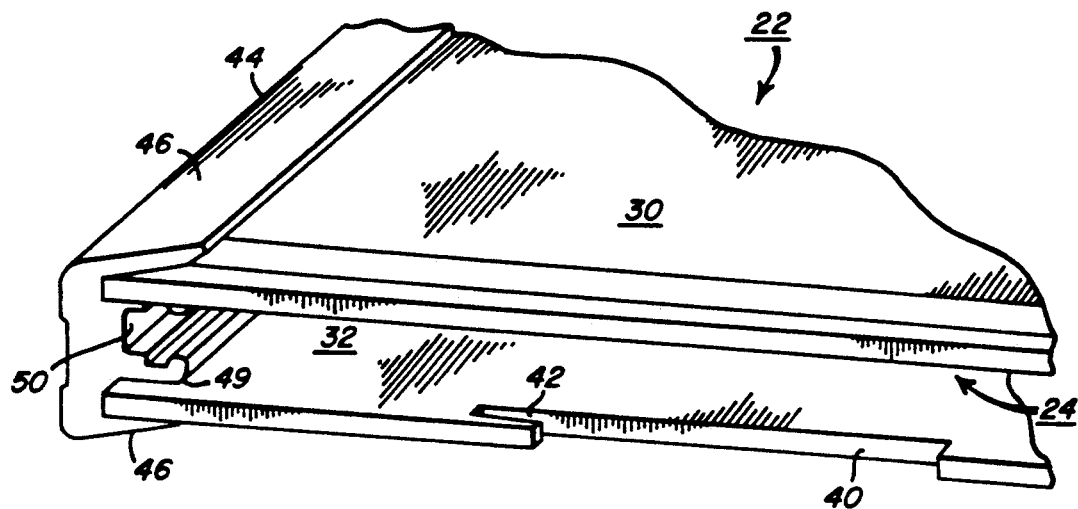
FIG. 4 is an enlarged fragmentary view of the front of the shell of the cassette of FIG. 1.

Shell 22 has three side caps 44 extending between and joining upper panel 30 to lower panel 32. Referring now particularly to FIG. 4, each side cap 44 has a pair of outside flanges 46 and a pair of inside flanges 48,49. Between inside flanges 48,49 is a central region 50. Flanges 46,48 project inwardly and are generally parallel. One of outside flanges 46 may be chamfered to accommodate the recess 36 of upper panel 30. Each panel 30,32 is held between a respective inside and outside flange 48,46, respectively, in the manner of a tongue and groove. Ends 52 of side caps 44 are mitered or otherwise cut away so as to provide snug fit and maintain a light tight connection between panels 30,32 and side caps 44. In a preferred embodiment of the invention, side caps 44 and end cap 54 have a uniform transverse cross-section, between ends 52 and other areas where material is removed. This permits all caps 44,54 to be formed from the same extrusion. In that embodiment of the invention, the faces of inside flanges 48,49 adjoining central region 50 bear a pair of opposed grooves 58, bordered inwardly and outwardly by a pair of roughly parallel portions 60. It is convenient to make side caps 44 and end cap 54 from an aluminum extrusion having the transverse cross-section illustrated for end cap 54, in FIG. 5. Portions of the extrusion are cut to length and miters and the like are machined in, as needed. Side caps 44 can be in the form of a single continuous piece of extrusion, cut and bent to shape.

Side caps 44 and panels 30,32 can be held together by a suitable adhesive or mechanical fasteners (not shown) or the like and corners can be reinforced with corner blocks (not shown) or the like.

Figure 11:
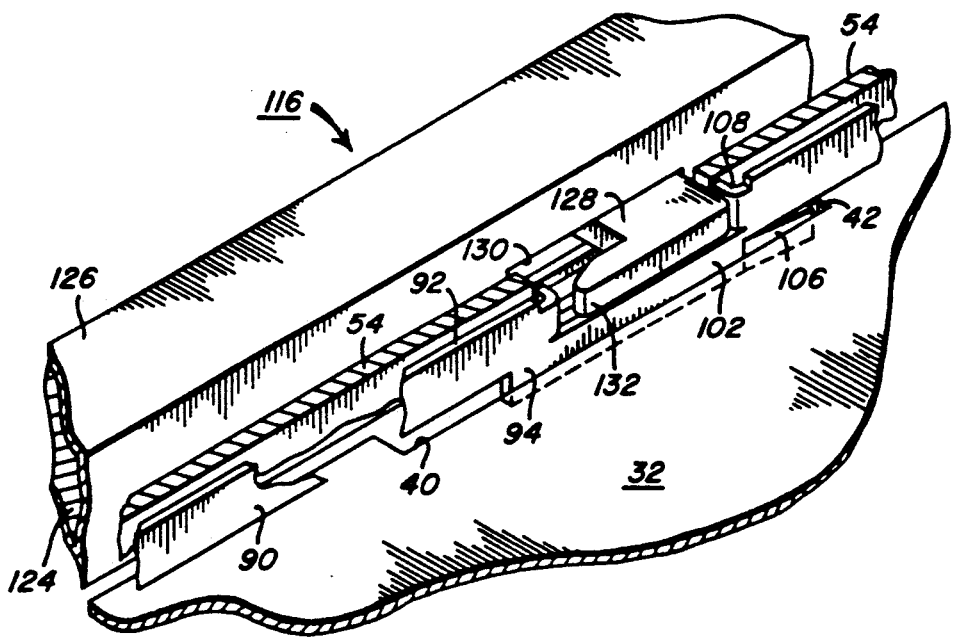
FIG. 11 is a fragmentary perspective view showing a portion of the latch bar in locked position and a portion of the extractor positioned within the extractor port and spaced apart from the extractor contact.

Referring now to FIGS. 3 and 5, insert 28 has an end cap 54 and a photographic element 62. Like side caps 44, end cap 54 has a central region 50, a pair of inside flanges 48,49 and a pair of outside flanges 46. End caps 54 are mitered or otherwise adapted to closely engage side caps 44. Central region 50 is interrupted by an extractor port 64, consisting of a series of slots 66 and a hole 68 extending through central region 50. Lower inside flange 49 is interrupted by a series of gaps (not shown), in which flange 49 is removed, at least to the depth of grooves 58. Gaps are aligned with respective slots 66 of extractor port 64 and, when insert 28 is assembled in shell 22, gaps are aligned with respective notches 40 in lower panel 32. This is best shown in FIG. 11. Photographic element 62 is rigid and has a planar body 74, which is adhered or otherwise fixed to a plug 76. Body 74 can be manufactured from composite materials, such as epoxy-graphite, or can be made of an aluminum honeycomb panel, as shown in FIGS. 3 and 5, having a honeycomb core and a pair of aluminum skins, with edges enclosed by hot-melt glue or the like. Photographic element 62 is cantilevered from end cap 54 and is substantially supported only by end cap 54. In a preferred embodiment of the invention, photographic element 62 has no contact with shell 22, when insert 28 is in place within shell 22. Photographic element 62 is offset from the centerline of end cap 54. This permits a considerable degree of flexing of upper panel 30 without endangering insert 28. A film element 78, such as a storage phosphor film (also referred to as stimulable phosphor) is affixed permanently on the top surface of photographic element 62.

Plug 76 joins photographic element 62 to end cap 54. Plug 76 is shown in FIG. 5 attached to opposed skins of aluminum honeycomb panel or body 74. Photographic element 62 joins plug 76 at an offset from center. Opposite photographic element 62, plug 76 has a mating section 80 complementary to parallel portions 60 and to approximately the inner half of grooves 58. In a preferred embodiment of the invention, plug 76 has a constant transverse cross-section and can be slid into engagement with end cap 54 during assembly. Plug 76 can be fixed in position by screws, adhesive or the like.

End cap 54, photographic element 62 and shell 22 together define upper and lower portions 82,84 of chamber 24, shown in FIG. 5 to the inside of the mitered ends 52 of the side cap 44. Inside flanges 48,49 of end cap 54 define a pocket 86 within end cap 54. Pocket 86 is closed by plug 76, which provides a light-tight joint between plug 76 and upper inside flange 48 of end cap 54. Gaps in lower inside flange 49 are not closed by plug 76. Light is substantially isolated from upper chamber portion 82 by the very convoluted light path between the exterior, through pocket 86, through lower chamber portion 84 and then into upper chamber portion 82.

A compression spring or other resilient member 88 is positioned at one end of pocket 86. A latch bar 90 adjoins spring 88. Referring now particularly to FIGS. 6 and 7, latch bar 90 has an elongate slide portion 92, which lies within pocket 86, an engagement portion 94, which extends through gaps and extractor, stylus and spring contacts, 96,98,100,respectively. In a particular embodiment of the invention, latch bar 90, with the exception of stylus contact 98, is formed from a single piece of rigid, strong strip material such as steel, which is cut and bent to appropriate shape. At one end of latch bar 90 is spring contact 100, which is a bent portion of strip. A slide portion 92 of latch bar 90 consists of several elongate sections of unmodified strip, which are configured so as to fit loosely between plug 76 and the walls of approximately the outer half of grooves 58, as shown in FIG. 5. The sections of slide portion 92 are joined together by throats 102 at which downwardly extending cut-outs 104 adjoin engagement portions 94. The length of engagement portions 94 is greater than that of corresponding cut-outs 104. Each engagement portion 94 has, at one end, a tab 106, which is inwardly directed. All engagement portions 94 are oriented in the same direction with tab ends opposite spring contact 100. Extractor contacts 96 are also bent portions of strip. Extractor contacts 96 are at the ends of respective cut-outs 104 nearest spring contact 100. Secondary extractor contacts 108 can be present at the opposite ends of cut-outs 104.

Figure 14:
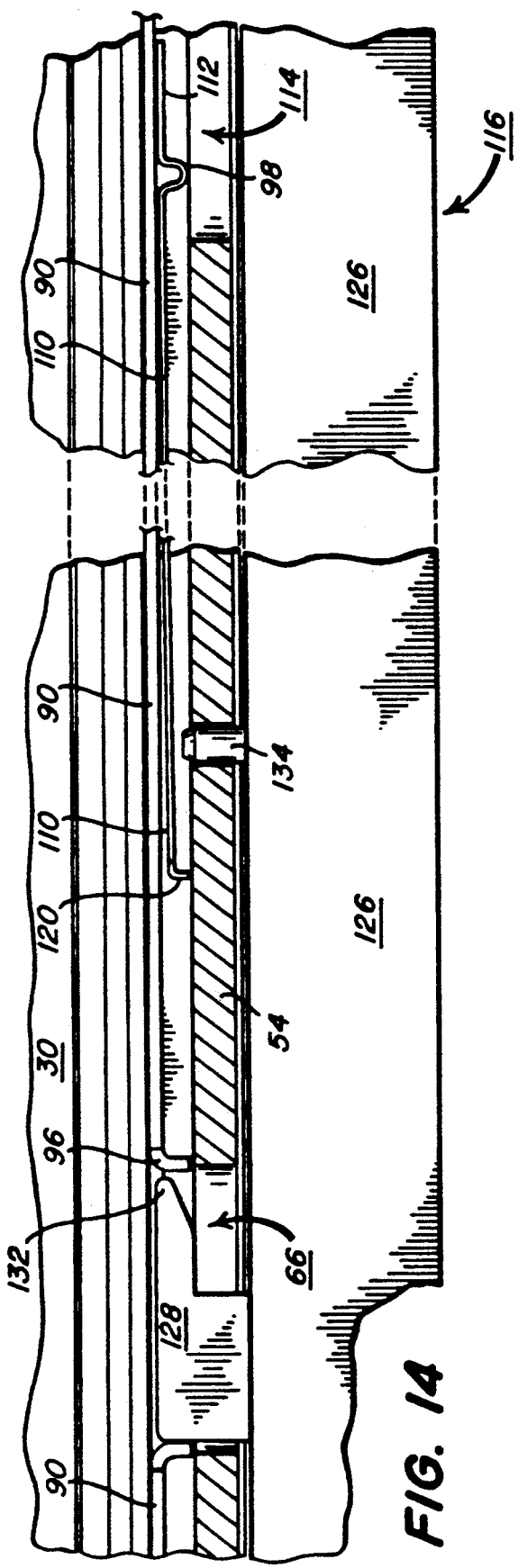
FIG. 14 is a fragmentary cross section similar to FIG. 13, but showing a portion of the latch bar in locked position and a portion of the extractor positioned within the extractor port and spaced apart from the extractor contact, as shown in FIG. 11.

Referring now to FIGS. 6 and 8, a catch 110 is adhered or otherwise fixed to latch bar 90 at a fixed end 112. Latch bar 90 includes a stylus contact 98, which, in a particular embodiment, is an outwardly extending bend in fixed end 112 of catch 110. The bend can be substituted by a protuberance or other structure on latch bar 90 that can be engaged by a stylus. Stylus contact 98 can be in association with or isolated from catch 110. In an embodiment of the invention in which stylus contact 98 protrudes from latch bar 90, like the bend shown in the Figures, it may be necessary that extractor port 64 include a dedicated slot 114 for stylus contact 98, which is not used by extractor 116, as shown in FIG. 14. Adjoining fixed end 112 of catch 110 is a leaf 118, which extends outward from latch bar 90 and away from spring contact 100. At the free end of leaf 118 is a stop 120, which is a bent portion that extends outward at an obtuse angle to leaf 118. Leaf 118 can be made of a resilient material, such as spring steel, or can include a compression spring or the like, positioned against latch bar 90. As a result of the resilient character of leaf 118, stop 120 can be pivoted, about an axis 122 defined by fixed end 112, from an extended position, indicated in solid lines in FIGS. 6 and 8, to a retracted position, indicated in dashed lines in FIG. 8. Axis 122 is disposed between spring contact 100 and stop 120 and is generally perpendicular to the longitudinal dimension of latch bar 90.

Referring now to FIGS. 1-3 and 9-15, insert 28 (FIG. 3) can be removed from shell 22 (FIG. 2), using extractor 116, shown in FIGS. 9-10, or using a stylus, such as a pencil (not shown). Extractor 116 has an inner hook member 124, which is movable longitudinally relative to an outer bar member 126. Hook member 124 has a series of fixed hooks 128 that extend through adjoining cut-away areas 130 of outer bar member 126 and are movable back and forth within cut-away areas 130. Each hook 128 has a projection 132; all projections 132 extend in the same direction. Outer bar member 126 can also include a fixed pin 134. The number of hooks 128, their dimensions and other characteristics of extractor 116 are determined by the configuration of extractor port 64 and latch bar 90. Extractor 116 can be part of a computed radiography reader, or can be a separate piece of apparatus.

Figure 12:
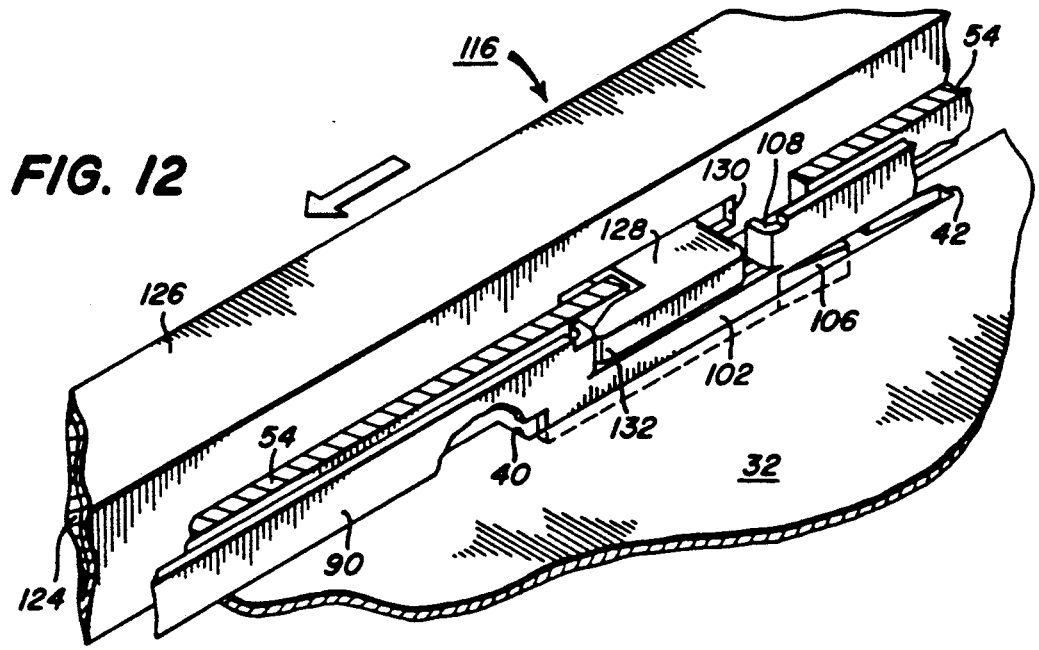
FIG. 12 is a view similar to FIG. 11, but showing the latch bar in released position following movement of the extractor against the extractor contact.
Figure 13:
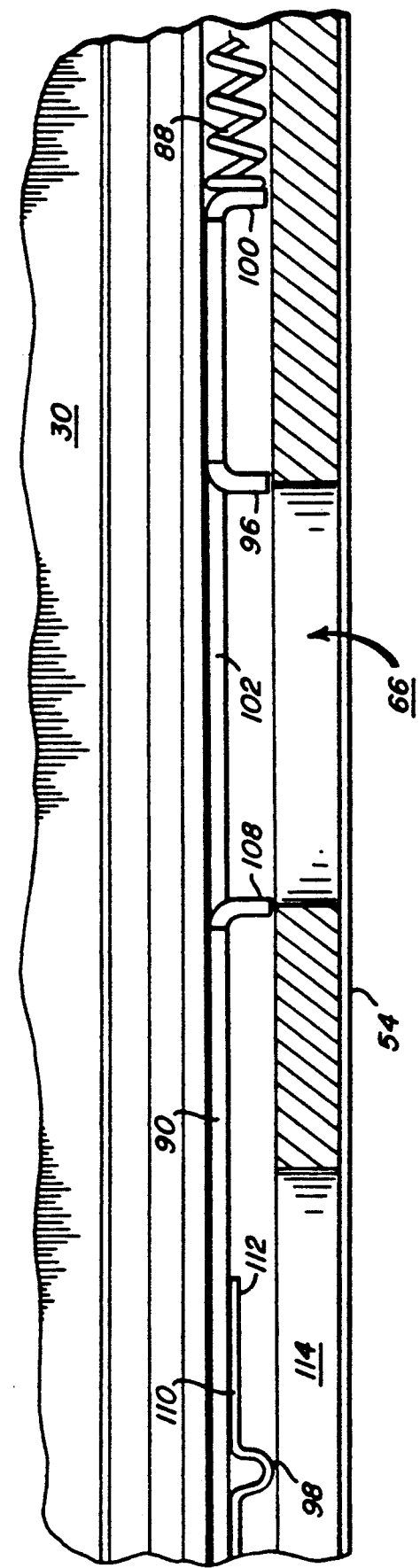
FIG. 13 is an enlarged fragmentary cross section view taken along line 13—13 of FIG. 5.
Figure 15:
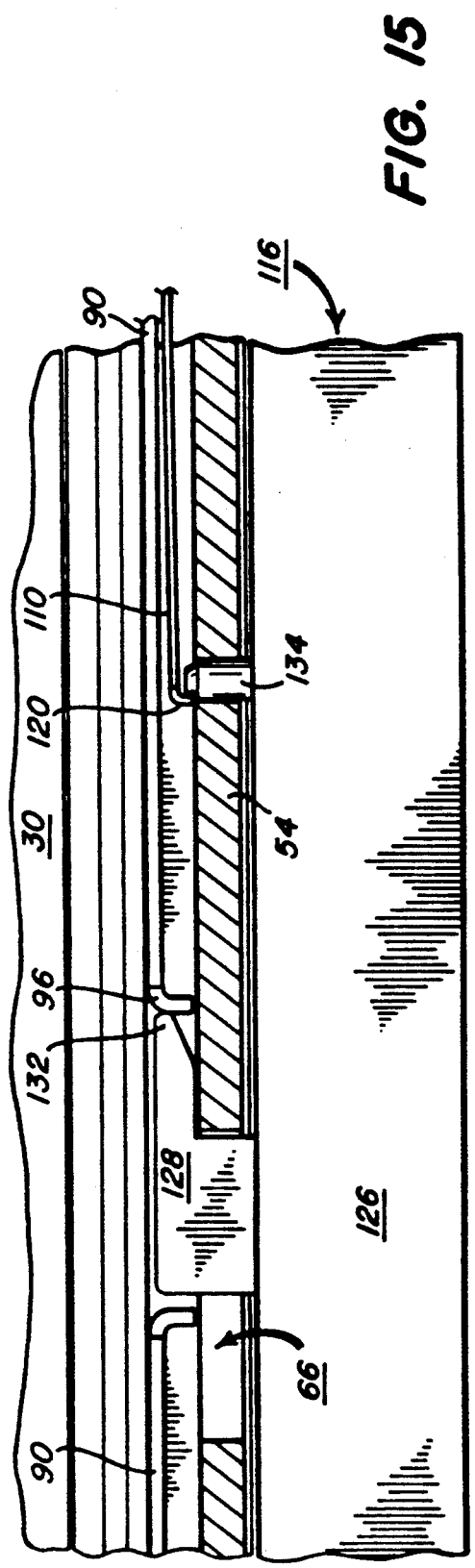
FIG. 15 is a view similar to FIG. 14, but showing the latch bar in released position following movement of the extractor against the extractor contact, as shown in FIG. 12.

When insert 28 is assembled in shell 22, cassette 20 has the appearance shown in FIG. 1 and latch bar 90 is in a locked position relative to end cap 54 and shell 22. The locked position is illustrated in FIGS. 11, 13, and 14. In the locked position, cut-outs 104 are aligned with slots 66 of extractor port 64 and engagement portions 94 are disposed within notches 40 of lower panel 32. Pin 134 is in pin hole 68. Tabs 106 are in engagement with set-back portions 42 of notches 40 and insert 28 is tightly assembled with shell 22. FIGS. 11 and 14 show extractor 116 positioned within extractor port 64. Hooks 128 of extractor 116 extend into cut-outs 104. Hook member 124 of extractor 116 is movable longitudinally relative to end cap 54 and shell 22, toward spring 88, to move latch bar 90 to a released position, as shown in FIGS. 12 and 15. As hook member 124 of extractor 116 is moved, projections 132 of hooks 128 engage extractor contacts 96 of latch bar 90. Continued movement of hook member 124 propels latch bar 90 toward spring 88, which compresses. Movement is stopped when hooks 128 reach the sides of slots 66. Pin 134 remains in pin hole 68.

In the released position, cut-outs 104 are no longer aligned with slots 66 of extractor port 64. Engagement portions 94 are disposed within notches 40 of lower panel 32, but tabs 106 do not engage lower panel 32. Projections 132 are disposed to the inside of end cap 54 and insert 28 can be pulled free of shell 22 by movement of extractor 116 and insert 28 relative to shell 22. Pin 134 acts to prevent insert 28 from falling off extractor 116 during manipulations of insert 28 by extractor 116. Insert 28 can be returned to shell 22 by reversing this procedure. As extractor 116 returns latch bar 90 from the released position to the locked position, hooks 128 press against secondary extractor contacts 108, if present. Latch bar 90 is urged toward the locked position by spring 88.

When latch bar 90 is in the locked position, stop 120 of catch 110 is within pocket 86, as shown in FIG. 14. When latch bar 90 is in the released position, stop 120 is pivoted toward hole 68. Stop 120 enters hole 68 and retains latch bar 90 in the released position by engaging hole 68, unless hole 68 is already occupied by pin 134 of extractor 116. Catch 110 thus serves to retain latch bar 90 in the released position, following movement of latch bar 90 from the locked position to the released position by pushing against stylus contact 98 with a stylus. The pivoting action of stop 120 helps retain latch bar 90 in the released position despite jarring. FIG. 14 shows the relative positions of stylus contact 98 and its slot 114 and makes apparent that stylus contact 98 remains accessible through its respective opening 136 even after movement of latch bar 90 to the released position. If pin 134 of extractor 116 is present in hole 68, then stop 120 is prevented from entering hole 68, thus defeating catch 110 and allowing extractor 116 to move latch bar 90.

The cassette 20 of the invention is easy to construct. Assembly is simple, in that separate components are generally just slid into place. Side caps 44 and end cap 54 can be made from a single extrusion to reduce production costs. Many of the dimensions of the cassette 20 need not be exact. Placement of insert 28 in shell 22 is easy since photographic element 62 does not have to be aligned with an internal fitting.

The cassette 20 of the invention has the advantages of simplicity, optional inclusion of an internal x-ray grid 34 and easy removal of a photographic element 62, by use of a hooked extractor 116 or manually with a stylus.

The invention has been described in detail with particular reference to a preferred embodiment thereof, but it will be understood that variations and modifications can be effected within the spirit and scope of the invention.

I claim:

1. An X-ray cassette comprising a shell, an X-ray grid disposed within said shell, a photographic element removably disposed within said shell, and an end cap rigidly supporting said photographic element substantially independently of said shell and closing said chamber opening, said shell defining a chamber and chamber opening, said photographic element being cantilevered from said end cap, said photographic element and said end cap being extractable from said shell, said photographic element and said shell define upper and lower portions of said chamber, said photographic element having a film element disposed in said upper portion of said chamber, said end cap defining a pocket, said pocket being substantially isolated from said upper portion of said chamber.

2. The x-ray cassette of claim 1 wherein said photographic element is displaceable relative to said shell.

3. The x-ray cassette of claim 1 wherein said photographic element is at least partially isolated from flexure of said shell.

4. The x-ray cassette of claim 1 wherein said grid is spaced apart from said photographic element and said photographic element has a storage phosphor film.

5. The X-ray cassette of claim 1 further comprising a latch bar having a slide portion disposed within said pocket and an engagement portion disposed in said lower chamber portion, said latch bar being resiliently movable from a locked position to a released position, said engagement portion engaging said shell in said locked position to substantially preclude relative motion of said end cap and said shell, said engagement portion being disengaged from said shell in said released position.

6. The cassette of claim 5 wherein said shell has substantially planar top and bottom panels and said engagement portion engages said bottom panel in said locked position.

7. The cassette of claim 5 wherein said end cap has an extractor port opening into said pocket and wherein said latch bar has an extractor contact and a stylus contact, said extractor contact being disposed in spaced relation to said extractor port in said released position, said stylus contact being aligned with said extractor port in said locked position and in said released position.

8. The cassette of claim 7 further comprising a stop engaging said extractor port and precluding return of said latch bar from said released position to said locked position when said stop is in an extended position and said latch bar is in said released position, said stop being resiliently pivotable toward said latch bar from said extended position to a retracted position within said pocket.

9. The cassette of claim 1 wherein said X-ray grid is disposed in said upper portion of said chamber.

10. An x-ray cassette comprising a shell, an insert having a photographic element and an end cap, said photographic element being disposed within said shell, said end cap being fixed to said insert, said insert and said shell defining an upper chamber and a lower chamber, said end cap defining a pocket, said end cap having an extractor port extending from the exterior through said end cap to said pocket, said end cap having a latch port extending between said lower chamber and said pocket, a latch bar disposed substantially within said pocket, said latch bar having an engagement portion extending through said latch port, said latch bar being resiliently movable relative to said extractor port from a locked position to a released position, said engagement portion engaging said shell in said locked position to lock said insert in fixed relation to said shell, said insert being extractable from said shell when said latch bar is in said released position.

11. The cassette of claim 10 wherein said pocket is in light-tight relation to said upper chamber and said photographic element has a phosphor plate disposed in light-tight relation to said lower chamber.

12. The cassette of claim 10 wherein said shell further comprises top and bottom panels and three side caps joining said top and bottom panels, said side caps each having a pair of opposed longitudinal ends, said side caps each having a substantially uniform transverse cross-section between said ends, and wherein the transverse cross-section of said end cap, in spaced relation to said port, is substantially the same as said transverse cross-section of said side caps.

13. The cassette of claim 10 further comprising a stop engaging said extractor port and precluding return of said latch bar from said released position to said locked position when said stop is in an extended position and said latch bar is in said released position, said stop being resiliently movable toward said latch bar from said extended position to a retracted position within said pocket.

14. The cassette of claim 13 wherein said stop is resiliently pivotable toward said latch bar about an axis displaced from said stop along said latch bar in substantially the direction of motion of said latch bar from said locked position to said released position.

15. The cassette of claim 13 further comprising a leaf angled outward from said latch bar, said leaf having one end fixed to said latch bar and the opposite end joined at an oblique angle to said stop.

16. The cassette of claim 10 wherein said latch bar has an extractor contact and a stylus contact, said extractor contact being disposed in spaced relation to said extractor port in said released position, said stylus contact being aligned with said extractor port in said locked position and in said released position.

17. The cassette of claim 10 further comprising an x-ray grid disposed in said upper chamber.

18. The cassette of claim 17 wherein said shell has upper and lower panels and said grid is recessed in said upper panel.

19. An x-ray cassette comprising a shell, said shell having upper and lower panels and three side caps joining said top and bottom panels, an insert having a photographic element and an end cap, said photographic element being disposed within said shell, said photographic element, said end cap and said shell defining an upper chamber and a lower chamber, said photographic element having a phosphor plate disposed in light-tight relation to said lower chamber, said caps each having a pair of inside flanges and a pair of outside flanges, each flange gripping a respective panel, said inside flanges of said end cap gripping said photographic element, said inside flanges and said photographic element defining a pocket, said pocket being in substantial isolation from said upper chamber, said end cap having an extractor port extending from the exterior through said end cap to said pocket, said end cap having a latch port extending between said lower chamber and said pocket, a latch bar disposed substantially within said pocket, said latch bar having an engagement portion extending through said latch port, said latch bar being resiliently movable relative to said extractor port from a locked position to a released position, said engagement portion engaging said shell in said locked position to lock said insert in fixed relation to said shell, said insert being extractable from said shell when said latch bar is in said released position.

20. The cassette of claim 19 wherein said latch bar has an extractor contact and a stylus contact, said extractor contact being disposed in spaced relation to said extractor port in said released position, said stylus contact being aligned with said extractor port in said locked position and in said released position.

21. The cassette of claim 20 further comprising a stop engaging said extractor port and precluding return of said latch bar from said released position to said locked position when said stop is in an extended position and said latch bar is in said released position, said stop being resiliently pivotable toward said latch bar from said extended position to a retracted position within said pocket.

22. The cassette of claim 21 further comprising an x-ray grid disposed in said upper chamber.

23. The cassette of claim 22 wherein said x-ray grid is recessed in said upper panel and spaced apart from said insert.

24. The cassette of claim 23 wherein said photographic element is cantilevered from said end cap.

* * * * *